United States Patent [19]

Scheibelhoffer et al.

[11] Patent Number: 5,874,503
[45] Date of Patent: Feb. 23, 1999

[54] LOW VOC UNSATURATED POLYESTER SYSTEMS AND USES THEREOF

[75] Inventors: Anthony S. Scheibelhoffer, Norton; Gerald W. Drabeck, Akron; Ronald E. Thompson, Parma; Dianna B. Dusek, Bedford; Timothy W. Birch, Ravenna, all of Ohio; Jeffrey L. Wilcoxson, Winonalake, Ind.

[73] Assignee: Ferro Corporation, Cleveland, Ohio

[21] Appl. No.: 916,478

[22] Filed: Aug. 22, 1997

Related U.S. Application Data

[63] Continuation of Ser. No. 431,512, May 1, 1995, Pat. No. 5,688,867.

[51] Int. Cl.⁶ .............................. C08F 8/00; C08L 67/06
[52] U.S. Cl. .................. 525/168; 528/274; 528/295.5; 528/296; 528/302; 525/10; 525/12; 525/15; 525/43; 525/44; 525/437; 525/444; 525/445; 525/446; 524/445; 524/449
[58] Field of Search ..................... 528/274, 295.5, 528/296, 302; 524/445, 449; 525/10, 12, 15, 43, 44, 168, 437, 444, 445, 446

[56] References Cited

U.S. PATENT DOCUMENTS

| | | | |
|---|---|---|---|
| 3,974,125 | 8/1976 | Oswald et al. | 523/216 |
| 4,175,064 | 11/1979 | Landau et al. | 525/17 |
| 4,616,054 | 10/1986 | Olson | 524/317 |
| 4,743,655 | 5/1988 | Williams | 525/172 |
| 4,904,536 | 2/1990 | Livesay | 428/515 |
| 4,918,120 | 4/1990 | Vanderlaan et al. | 523/465 |
| 5,198,480 | 3/1993 | Benton et al. | 523/500 |
| 5,371,117 | 12/1994 | Parish et al. | 523/219 |
| 5,373,058 | 12/1994 | Hager et al. | 525/168 |

FOREIGN PATENT DOCUMENTS

| | | |
|---|---|---|
| 239103 | 10/1959 | Australia . |
| 708157 | 10/1995 | European Pat. Off. . |
| 239206 | 1/1964 | Netherlands . |

OTHER PUBLICATIONS

European Search Report for Application No. 96304542.2; mailed Dec. 12, 1996.

*Primary Examiner*—Samuel A. Acquah
*Attorney, Agent, or Firm*—Renner, Otto, Boisselle & Sklar

[57] ABSTRACT

This invention relates to a polyester resin comprising (A) from about 5% to about 50% by weight reactive diluent and (B) from about 50% to about 95% by weight of an unsaturated polyester resin prepared from at least one component selected from the group consisting of (i) from about 0.5% up to about 8% by mole of a polyhydric alcohol, having at least three hydroxyl groups, and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms. In another aspect, the invention relates to mixtures of the above polyester resins with conventional polyester resins. Methods of reducing volatile organic compound emissions are also part of the invention. The present invention provide resins and methods which have low emissions of volatile organic compounds and when used in curable compositions have good gel times and final cured properties.

25 Claims, No Drawings

LOW VOC UNSATURATED POLYESTER SYSTEMS AND USES THEREOF

This is a continuation application Ser. No. 08/431,512, filed May 1, 1995 now U.S. Pat. No. 5,688,867.

FIELD OF THE INVENTION

This invention relates to unsaturated polyester resins systems and methods of using the same.

BACKGROUND OF THE INVENTION

Unsaturated polyester resins are typically used together with a reactive diluent, usually a volatile unsaturated organic monomer, which is generally referred to as a reactive diluent. The unsaturated organic monomer copolymerizes with the polyester resins to form a gelcoating and may be used in other applications such as pultrusion, resin lamination, sheet molding compounding, bulk molding compounding, etc.

During curing some of the volatile organic monomer is lost to the atmosphere. Due to environmental concerns of such organic compounds, legislation has been passed which requires reduction in the amount of volatile organic compounds which may be released to the atmosphere.

One method of reducing such VOC emission is replacement of the reactive diluent with a less volatile reactive diluent. However, this approach has led to slower curing times and/or incomplete curing at normal ambient temperatures. Another approach is the reduction in the amount of reactive diluent. This approach has led to increases in viscosity beyond useable values. If viscosity increase is compensated by use of a lower molecular weight polyester, then poor final gelcoat properties have resulted. Another approach has been the use of a suppressant which reduces the loss of VOCs. The suppressants are often waxes which lead to a reduction in interlaminar adhesion of the gelcoat. It is desirable to have a gelcoat product which has reduced VOC and also which has acceptable gel time and good final gelcoat properties.

SUMMARY OF THE INVENTION

This invention relates to a polyester resin comprising (A) from about 5% to about 50% by weight reactive diluent and (B) from about 50% to about 95% by weight of an unsaturated polyester resin prepared from at least one component selected from the group consisting of (i) from about 0.5% up to about 8% by mole of a polyhydric alcohol, having at least three hydroxyl groups, and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms. In another aspect, the invention relates to gelcoats having mixtures of the above polyester resins with conventional polyester resins. In another aspect, the invention relates to the addition of suppressants which reduce volatile organic compound emissions. Methods of reducing emissions volatile organic compounds are also part of the invention. The present invention provide resins and methods which have low emissions of volatile organic compounds and which have good gel times and final cured properties.

DESCRIPTION OF THE PREFERRED EMBODIMENTS

In the specification and appended claims, the term polyester resin system refers to the combination of an unsaturated polyester resin and a reactive diluent. The term gelcoat refers to compositions containing the unsaturated polyester system and other gelcoat components such as thixotropic agents, copromoters, pigments, air release agents, etc.

The use of the term "conventional" polyester resin refers to unsaturated polyester resins in reactive diluent which are available commercially. The conventional polyester is separate and distinct from the unsaturated polyester resin systems described herein. The conventional polyesters are described below including commercial examples.

The term surface tension relates to a measure of the surface energy of the cured gelcoat. The surface tension is determined using water and methyl iodine. A drop is placed on a cured gelcoat and the contact angle is measured by a goniometer (Model 100-00 from Rame-Hart Inc.). The contact angle may be used to determine the total surface tension, as well as polar and dispersive surface tensions. The equations for determining the surface tension from contact angle are found in S. Wu, *Polymer Interfaces and Adhesion*, Marcel Dekker, Inc., New York (1982). The sections related to surface tension and its measurement are hereby incorporated by reference.

Reactive Diluent

The reactive diluent typically comprises from about 5% to about 50%, or preferably from about 10% to about 45%, or more preferably from about 15% to about 35% by weight of the unsaturated polyester system. Here as well as through the specification and claims, the range and ratio limits may be combined. The reactive diluent is preferably an ethylenically unsaturated, monomeric compound, which include allyl and vinyl compounds conventionally used for the preparation of unsaturated polyester moldings, impregnating and coating compositions. Examples of reactive diluents include styrene, substituted styrenes, e.g., methoxystyrene, divinylbenzene, 4-ethylstyrene, 4-methylstyrene, 4-t-butylstyrene, p-chlorostyrene or vinyltoluene, esters of acrylic acid and methacrylic acid with alcohols or polyols (such as those described herein) each having from 1 to 18 carbon atoms, e.g., methyl methacrylate, butylacrylate, ethylhexyl acrylate, hydroxpropyl acrylate, lauryl acrylate, stearyl methacrylate, lauryl methacrylate, butanediol diacrylate, and trimethylolpropane triacrylate, allyl esters, e.g., diallyl phthalate, and vinyl esters, e.g., vinyl ethylhexanoate, vinyl pivalate, limonene, dipentene, vinyl ethers, indene, allyl benzene, and the like. Mixtures of these compounds may be used. Preferred components are styrene, α-methylstyrene, vinyltoluene, and divinyl-benzene.

In one embodiment, the reactive diluent is a mixture of styrene and less volatile organic monomers. The styrene is generally present in a majority (e.g., greater than 50%) amount preferably up to about 70%, or up to about 80% by weight) of the reactive diluent. The remainder of the reactive diluent are less volatile monomers such as those above reactive diluents with a lower vapor pressure, and preferably α-methylstyrene, vinyltoluene, divinyl-benzene and methyl methacrylate.

Polyester Resin

The polyester resin is typically the condensation product of a polycarboxylic acid or its derivative (anhydrides, $C_{1-8}$ alkyl esters, etc.) and a polyhydric alcohol. The polyester resin usually encompasses from about 50% to about 95%, or preferably from about 55% to about 90%, or more preferably from about 60% to about 85% by weight of the unsaturated polyester resin system. The inventors have discovered that polyester resin having lower acid numbers, such as less than about 30, with about 20 or less being preferred, have good spraying properties in applications where the unsaturated polyester resin system is applied by spraying. In one embodiment, the polyester has a narrow molecular weight distribution ($\overline{Mw}/\overline{Mn}$). The molecular weight distribution is typically from about 2 to about 8, or preferably from about 2.5 to about 5. In one embodiment, the polyester resin is free of dicyclopentadiene olefins, alcohols or acids.

As described above, the polyester resins may be prepared with at least one component selected from the group consisting of (i) from about 0.5% up to about 8% by mole of a polyhydric alcohol, having at least three hydroxyl groups, and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms. The polyhydric alcohols typically have from about 4 to about 12, preferably from about 4 to about 8 carbon atoms. In one embodiment, the polyhydric alcohols have a neo structure, e.g. a carbon atom bonded solely to other carbon atoms. Examples of the polyhydric alcohols are listed below and include glycerol, pentaerythritol, dipentaerythritol, tripentaerythritol, trimethylolethane, trimethylolpropane, and di-trimethylolpropane. These polyhydric alcohols are generally present in an amount from about 1% to about 6%, more preferably from about 2% to about 5% by mole.

In one embodiment, the polyester resin is prepared with a transesterification catalyst. The catalyst is present in an amount from about 0.05% to about 2% by weight. Transesterification catalyst include metal-containing catalysts metal glycoxides, such as antimony glycoxide; alkali metal borohydrides, such as sodium borohydride, potassium borohydride, magnesium borohydride, calcium borohydride, aluminum borohydride, titanium borohydride, and tin borohydride; metal oxides, such as beryllium oxide, magnesium oxide, antimony trioxide, tin(IV) oxide, and dibutyltin oxide; metal hydroxides, such as magnesium hydroxide, metal acetates such as magnesium acetate, manganese acetate, tin(IV) acetate, metal carbonates, such as lithium carbonate, sodium carbonate, potassium carbonate, magnesium carbonate, tin(IV) carbonate, tetraalkyl metals, such as tetraalkyl titanate, such as tetraisopropyl titanate, tetra-n-butyl titanate, and tetrakis (2-ethylhexyl) titanate, and tetraalkyl zirconate, such tetraisopropyl zirconate, tetra-n-butyl zirconate, tetrakis (2-ethylhexyl) zirconate; and metal nitrates, such as tin(IV) nitrate. Other suitable transesterification catalysts include, for example, Bronsted acids such as sulfuric acid and Lewis acids such as aluminum triisopropoxide. Preferred transesterification catalysts are antimony glycoxide, ($Sb_2(OCH_2CH_2O)_3$), and manganese acetate in about equal portions.

In another embodiment, the polyester resin is prepared using (ii) from about 2% up to about 12% by mole of a reaction product of a polyol and a fatty carboxylic acid. The reaction product may contain an average of two, three or more, preferably two, residual hydroxyl groups which may be used in the preparation of the polyester resin. Residual hydroxyl groups are those remaining after the reaction of the polyol and the fatty acid. The residual hydroxyl groups are reacted in preparing the unsaturated polyester systems. The polyols include those which have three or more hydroxyl groups, such as those listed herein, and have from about three to about 12, preferably from about 3 to about 8 carbon atoms. The fatty acids include those having from about 8 to about 30, preferably from about 12 to about 24, more preferably from about 14 to about 22 carbon atoms.

Examples of fatty acids include dodecanoic acid, hexadecanoic acid, stearic acid, palmitic acid, oleic acid, etc. The preferred reaction products are glycerol based, such as glycerol monostearate. In one embodiment, the fatty acids are saturated fatty acids.

In another embodiment, the polyester resin may be prepared from (iii) from about 2% up to about 12% by mole of at least one fatty reactant selected from the group consisting of a fatty primary alcohol, a fatty epoxide, a fatty monocarboxylic acid and mixtures thereof, wherein each member of the group has up to about 100 carbon atoms. In one embodiment, (iii) contains from about 12 to about 90, or from about 25 to about 80 carbon atoms. In one embodiment, (iii) is saturated. Generally, (iii) may contain up to about 25% by weight of nonfunctional hydrocarbon diluent. Component (iii) is typically present in an amount from about 3% to about 12%, more preferably from about 4% to about 10% by mole. Examples of fatty alcohols include oleyl alcohol, lauryl alcohol, stearyl alcohol, UNILIN 425 (a $C_{30}$ avg. linear primary alcohol), UNILIN 550 (a $C_{40}$ avg. linear primary alcohol), and UNILIN 700 (a $C_{50}$ avg. primary alcohol). UNILIN alcohols are available from Petrolite Corporation. The fatty epoxides include epoxidized fatty alcohols, such as oleyl epoxide, stearyl epoxide, epoxidized soybean oil. epoxidized linseed oil, epoxidized $C_{8-50}$ alpha-olefins, etc. The fatty acids may be any of the monocarboxylic acids discussed herein.

Polyester resin are typically reaction products of polybasic carboxylic acids or their derivatives and polybasic alcohols, and, in this invention, include one or more of the above described components B (i) through (iii). The carboxylic acids and their derivatives are typically dibasic unsaturated, preferably $\alpha,\beta$-olefinically unsaturated, carboxylic acids or their derivatives. Examples of these carboxylic acid and their derivatives include maleic acid, fumaric acid, chloromaleic acid, itaconic acid, citraconic acid, methyleneglutaric acid and mesaconic acid and their esters or preferably their anhydrides, as well as succinic acid, glutaric acid, d-methylglutaric acid, adipic acid, sebacic acid, pimelic acid, phthalic anhydride, o-phthalic acid, isophthalic acid, terephthalic acid, dihydrophthalic acid, tetrahydrophthalic acid, tetrachlorophthalic acid, dodecanedicarboxylic acids, nadic anhydride, cis-5-norbornene-2,3-dicarboxylic acid or anhydride, dimethyl-2,6-naphthenic dicarboxylate, dimethyl-2,6-naphthenic dicarboxylic acid, naphthenic dicarboxylic acid or anhydride and 1,4-cyclohexane dicarboxylic acid. Monobasic, tribasic or higher polybasic carboxylic acids, for example ethylhexanoic acid, methacrylic acid, propionic acid, benzoic acid, 1,2,4-benzenetricarboxylic acid or 1,2,4,5-benzenetetracarboxylic acid may also be used in preparing the polyester resins.

In one embodiment, the carboxylic acids and their derivatives are the combination of a non-aromatic carboxylic acid or derivative and an aromatic carboxylic acid or derivative. Examples of the various acids and their derivatives are disclosed above. The non-aromatic acid is typically present in an amount from about 40% to about 70%, preferably from about 40% to about 65%, or more preferably from about 45% to about 60% by mole of non-aromatic carboxylic acid or derivative. These carboxylic acids typically have from about 3 to about 12, or from about 3 to about 8, or from about 4 to about 6 carbon atoms. Preferred acids or derivatives are maleic or fumaric acids or esters and maleic anhydride.

The aromatic carboxylic acids or their derivatives are generally present in an amount from about 30% to about 60% by mole, preferably from about 35% to about 60%, or more preferably from about 40% to about 55% by mole. The aromatic carboxylic acid or their derivatives have from about 8 to about 18, preferably from about 8 to about 12 carbon atoms. The aromatic carboxylic acids and their derivatives are disclosed above. The aromatic carboxylic acids and derivatives are disclosed above and preferred aromatic carboxylic acid and derivatives, include phthalic anhydride, o-phthalic acid, iso-phthalic acid, etc.

As described above the polyester resin is prepared from polyhydric alcohols, preferably glycols. Suitable polyhydric alcohols include alkanediols and oxa-alkanediols, for example, ethyleneglycol, 1,2-propyleneglycol, propane-3-diol, 1,3-butyleneglycol, butene-1,4-diol, hexane-1,6-diol, 2,2-dimethylpropane-1,3-diol, diethyleneglycol, triethyleneglycol, polyethyleneglycol, cyclohexane- 1,2-diol, 2,2-bis-(p-hydroxycyclohexyl)-propane, butene- 1,4-diol, 5-norbornene-2,2-dimethylol, 2,3-norbornene diol, and cyclohexane dimethanol. Preferably the polyhydric alcohols are neopentyl glycol and propyleneglycol.

In one embodiment, the polyester resin is prepared from polyhydric alcohols where from about 45% to about 70%, preferably from about 50% to about 65% by mole of the polyhydric alcohols are those having a neo structure. Examples of such alcohols include neopentylglycol, dimethylpropane-1,3-diol, 2,2-dimethylheptanediol, 2,2-dimethyloctanediol, 2,2-dimethyl-1,3-propanediol, pentaerythritol, dipentaerythritol, tripentaerythritol, trimethylolpropane, di-trimethylolpropane, 2,2,4-trimethyl-1,3-pentanediol, 2-butyl-2-ethyl-1,3-propanediol, 3-hydroxy-2,2-dimethylpropyl 3-hydroxy-2,2-dimethyl propanate, etc.

In another embodiment, the unsaturated polyester is prepared from alcohols having a neo structure. In this embodiment, preferably greater than 80%, or greater than 90% by mole or all of the polyhydric alcohols have a neo structure. Examples of neo structure containing a polyhydric alcohols are discussed above.

Conventional Polyesters

The conventional unsaturated polyesters are those which are available commercially and contain reactive diluent. They are prepared from one or more of the above polycarboxylic acids or derivatives and one or more of the above polyhydric alcohols. In one embodiment, the conventional polyester is prepared from a combination of a non-aromatic and an aromatic carboxylic acid or derivative thereof, preferably phthalic acid and maleic anhydride. The polyol is typically neopentylglycol and propyleneglycol. The conventional polyester generally contains from about 20% to about 45% or preferably from about 30 to 38% reactive diluent such as those described above. The unsaturated polyester resin is typically present in an amount from about 55% to about 85%.

Commercial polyester resins are available as ortho or iso polyester from many companies. Examples of these companies include Reicold Chemical, Ashland Chemical, Huls AG, and Alpha Resin.

Suppressants

In another embodiment of the present invention the polyester resin compositions systems may include a suppressant. The suppressant acts to reduce volatile organic emissions. The suppressants include polyethers, polyether block copolymers and polyether polysiloxane block copolymers as well as alkoxylated alcohols, alkoxylated fatty acids and polyalkoxypolysiloxanes. The suppressants are generally present in an amount from about 0.05% to about 4% or from about 0.25% to about 3%, or from about 0.5% to about 2%. Examples of useful suppressants include but are not limited to polyethers in particular poly-(ethylene glycols) (PEG) having at least five oxyethylene units, poly-(propylene glycols) (PPG), monoalkoxyl-poly-(propylene glycols), monomethoxy-poly(ethylene glycols) (MPEG) having at least five oxyethylene units and the like; polyether block copolymers in particular poly-(ethylene glycol)-poly-(propylene glycol) block copolymers (PEG-b-PPG), and the like; and polyether-polysiloxane block copolymers, in particular poly-(alkylsiloxane)-polyether block copolymers, poly-(alkylarysiloxane)-polyether block copolymers, and the like. Vinyl functional derivatives of the polymers include but are not limited to polyoxyethylene maleate half-acid esters of five or more oxyethylene units, in particular monoalkoxy poly-(ethylene glycols) of five or more oxyethylene units, poly-(dimethylsiloxane)-polyether block copolymers (PDMS-b-polyethylene glycol/polypropylene glycol) and the like. Suppressants include BYK S-740 (believed to be a hydroxy polyester with paraffin wax), available from BYK Chemie USA, and STYRID (believed to be a wax in a mineral oil) available from Specialty Products Company, Jersey City, N.J.

In one embodiment, the above unsaturated polyester resin systems are used as suppressants in gelcoats containing a polyester resin, such as the conventional polyester resins. The unsaturated polyester resin systems are generally present in an amount from about 5% to about 40%, or from about 10% to about 30% by weight. The unsaturated polyester resin systems, when used as a suppressant, are added to the gelcoat which already contains another polyester. Preferred suppressant unsaturated polyester resin system are those designated as B(ii) and B(iii) above.

Surface Tension Agents

In one embodiment, of the invention, the unsaturated polyester resin system contains a surface tension agent. The surface tension agent is generally present in an amount from about 0.001% up to about 1%, or from about 0.01% up to about 0.5% by weight. These agents act to reduce the polar surface tension to a value below the dispersive surface tension. The surface tension agent lowers the surface tension at the surface of the cured gelcoat. Examples of surface tension agents silicone and fluorocarbon surfactants. Examples of silicone surfactants include dimethyl silicones, liquid condensation products of dimethylsilane diol, methyl hydrogen polysiloxanes, liquid condensation products of methyl hydrogen silane diols, dimethysilicones, aminopropyltriethoxysilane, and methyl hydrogen polysiloxanes. In one embodiment, the silicone surfactant is a polysiloxane preferably a polydimethylsiloxane block polyether, such as BYK-306 available from BYK Chemie USA. The inventors have discovered that these surfactants also control formation of fish eyes in brushed applications. These surfactants are sold under the tradename DOW CORNING fluids and additives from Dow Corning Chemical and SF-69 and SF-99 from General Electric, and BYK polysiloxanes available from BYK Chemie USA.

Fluorocarbon surfactants, such as fluorinated potassium alkyl carboxylates, fluorinated alkyl quaternary ammonium iodides, ammonium perfluoroalkyl carboxylates, fluorinated alkyl polyoxyethylene ethanols, fluorinated alkyl alkoxylates, fluorinated alkyl esters, and ammonium perfluoroalkyl sulfonate sold under the FLUORAD tradename of 3M Company.

Polyester Resin Preparation

The polyester resins may be prepared by usual esterification means known to those skilled in the art. In one embodiment, the polyester resins are prepared by mixing the carboxylic acids or their derivatives with a polyol and heating the mixture to about 120° C. to about 160° C. The mixture heats exothermically by about 30 degrees, for instance to 170° C. The mixture is heated to 175° C. to about 215° C. or higher. The reaction is continued until the desired acid number is reached. When the above described polyol having three or more hydroxyl groups are used, then the polyol is added together with the acids or their derivatives and reacted before addition of any other polyols used to make the polyester. When using the polyol with three or more hydroxyl groups, a transesterification catalyst is added when about 50% of the theoretical water is removed from the reaction.

When isophthalic acid and maleic anhydride are used in preparing the polyester resin, then the above procedure is modified by adding all acids and alcohols except maleic anhydride. Maleic anhydride is added when the reaction mixture is clear (about 50% of the theoretic water is removed).

Acid number is a reflection of the extent of esterification and molecular weight of the polyester resin. The esterification is typically continued until the polyester has the acid number corresponding to the desired molecular weight. In one embodiment, the final acid number is in the range less than 30, preferably less than 20. For applications which require spray application, the inventors have discovered that polyester resin with acid number less than about 30 are preferred and less than about 25 are more preferred.

As described above the progress of the reaction may be followed by acid number. The acid number may be reduced by increasing temperature and/or maintaining the reaction temperature until the acid number is reduced to the desired level. In one embodiment, the acid number may be reduced by using an acid neutralizer. The acid neutralizer is added in an amount sufficient to lower the acid number to the desired level. In one embodiment, the acid neutralizer is added when the acid number is in the range of about 40 to about 70, preferably from about 45 to 65, more preferably from about 50 to about 60. Examples of acid neutralizers include ethylene carbonate, glycidyl neodecanate (Cardura E-10, available from Shell Chemical Co.), carbodimides, isocyanates, MTMI (benzene-1-(1-isocyanato-1-methylethyl)-3-(1-methylethenyl-a,a-dimethyl-meta-isopropenyl-benzoisocyanate) from Cyanamid, glycidyl methacrylate, fatty primary alcohols, fatty epoxides, and mixtures thereof.

Applications

The above unsaturated polyester systems may be used in a variety of applications which include gelcoating, resin lamination, pultrusion, sheet molding compounding, bulk molding compounding, etc. The coating and articles of manufacture include sinks, countertops, shower stalls/tubs, spas, boat hulls, patio brick coatings, etc.

The unsaturated polyester system may be used together with other additives to form gelcoats and polyester articles. The applications may include the spray up manufacture of coating and articles. In this method, one or more of the above unsaturated polyester system is fed into a spray gun along with fillers, such as chopped fiberglass, mica and/or thixotropic agents, such as fumed silica or precipitated silica. The unsaturated polyester system may be mixed with the fibers internal or external to the spray gun. Another method of using unsaturated polyester systems is the hand lay up method of fabrication. In this method the fiberglass, as roving or chopped fibers are added to an open mold and the unsaturated polyester system is wetted out on the fiberglass by hand rollers, brushes and squeegees. Pultrusion involve pulling roving fiberglass strands through a unsaturated polyester system bath and through a heated die.

Gelcoats

Gelcoats are curable compositions which contain one or more of the above unsaturated polyester systems along with other additives. These other additives include thixotropic agents, suppressants, surface tension agents, copromoters, air release agents, fillers and optionally pigments.

The thixotropic agents include silica compounds (including fumed silica and precipitated silica), and inorganic clays (including bentonite and hectorite clay). Precipitated silica is preferred for non-aqueous applications and for its abilities to reduce volatile organic emissions. These agents are typically present in an amount from about 0.5 to about 5, or from about 1 to about 4 parts per 100 parts of neat polyester resin.

The gelcoat may also contain fillers, such as pyrex glass, chopped fiberglass, flint and crown glasses, talc, silicone dioxide, titanium dioxide, calcium carbonate, magnesium carbonate, barium carbonate, calcium sulfate, magnesium sulfate, and barium sulfate. The fillers are present in an amount from about 5 to about 40, or from about 10 to about 35 parts per 100 parts of neat polyester resin.

Promoters are any electron donating species which helps in the decompositions of the catalyst. The promoters are usually added to unsaturated polyester resin systems to accelerate the decomposition of a peroxide initiator to free radicals and thereby initiate or speed the curing of the composition at relatively low temperatures, i.e., at temperatures in the range of 0° to 30° C. The promoters are generally used from about 0.01% to about 1%, or from about 0.03% to about 0.5%, preferably about 0.06% by weight. Among the materials that have been reported as being effective promoter are metal compounds, such as cobalt, manganese, iron, vanadium, copper, and aluminum salts of organic acids; amines, such as dimethylaniline, diethylaniline, and 2-aminopyridine; Lewis acids, such as boron fluoride dihydrate and ferric chloride; bases, such as tetramethyl ammonium hydroxide; quaternary ammonium salts, such as trimethylbenzyl ammonium chloride and tetrakismethylol phosphonium chloride; and sulfur compounds, such as dodecyl mercaptan and 2-mercaptoethanol; dimethyl acetoacetamide; and methyl acetoacetate. Cobalt salts of organic acids are the most widely-used accelerators for the low temperature decomposition of peroxide catalysts and the curing of unsaturated polyester resin compositions. It is generally preferred that cobalt and potassium salts of aliphatic monocarboxylic acids having 5 to about 20, or from about 8 to about 12 carbon atoms or alicyclic acids having about 5 to about 7 carbon atoms be present in the promoter systems. Particularly useful promoter include COBALT HEXCHEM (cobalt octanoate) and POTASSIUM HEXCHEM (potassium octanoate), dimethyl acetoacetamide; and methyl acetoacetate.

The alkyl acrylate or methacrylate is typically used in combination with a vinyl aromatic monomer. The alkylacrylate or methacrylate is usually present in an amount up to 20%, from about 0.5% to about 15%, or from about 1% to about 10%, or from about 1% to about 5% by weight of gelcoat. The alkylacrylates or methacrylates are described above.

Typically, the gelcoat is prepared by blending a polyester resin system with the gelcoat components as is known to those in the art. After addition of the additives the gelcoat compositions is diluted with reactive diluent to a Brookfield viscosity from about 2,000–4,000, or from about 3000–4000, or from about 3500–3600 cPs at 77° F., using spindle #4. The gel time of a small portion of the gelcoat is determined. If the gel time is too short, then inhibitors, such as phenols like hydroquinone and hydroquinone methyl ester material are added to make the gel time increase. If the gel time is too long, then one or more of the above promoters is added to decrease the gel time.

A pigmented gelcoat, for example, is prepared by adding 12 parts titanium dioxide, 0.25 parts of ethyleneglycol, 0.5 parts of 5% hydroquinone solution, 15 parts of talc, 3 parts of styrene monomer, 1.7 parts of fumed silica, 3 parts of methyl methacrylate, 0.26 parts of potassium octanoate, 8 parts of styrene monomer, 0.14 parts of cobalt octanoate (12%), 0.3 parts of air release agent, 3 parts of styrene monomer, and 0.1 parts of methyl methacrylate to 43 parts of unsaturated polyester resin system.

The following example relates to unsaturated polyester resins and unsaturated polyester systems. Unless otherwise specified, in the examples as well as elsewhere in the specification and claims, amounts and percentages are by weight, the temperature is in degrees Celsius, and pressure is atmospheric pressure.

EXAMPLE 1

(a) A reaction vessel is charged with 30.8 grams (0.5 mole) of trimethylolpropane, 238.2 grams (3.5 moles) of phthalic anhydride, and 236.1 grams (5.3 moles) of maleic anhydride under a nitrogen sparge. The mixture is heated and the final temperature is 190° C. The reaction mixture is cooled to 140° C. where 113.26 (3.2 moles) of propyleneglycol and 241.8 grams (5.1 moles) of neopentylglycol are added to the reaction vessel. The reaction mixture is heated to 205° C. when 35 grams of water are evolved then 0.5 grams of manganese acetate and 0.50 grams of $Sb_2(OCH_2CH_2O)_3$ are added to the reaction vessel. The reaction temperature is maintained until 52 grams of water distillate is collected. The acid number is 56 and 80 grams of ethylene carbonate are added to the reaction vessel. The temperature is heated to 205° C. until the acid number is 20. The resin has $\overline{Mw}$=3198, $\overline{Mn}$=881 and $\overline{Mw}/\overline{Mn}$=3.6.

(b) The above resin is diluted with styrene to a concentration of 80% resin and 20% styrene.

EXAMPLE 2

(a) A reaction vessel is charged with 168.1 grams (3.5 moles) of maleic anhydride, 159.1 (2.2 moles) of phthalic anhydride, 265.8 grams (1.5 moles) of glycerol monostearate under a nitrogen sparge The mixture is heated to 140° C. where 75.7 grams of propyleneglycol and 161.6 grams (3.2 moles) of neopentylglycol are added to the reaction vessel. The reaction temperature is increased to 180° C. under a nitrogen flow of 350 cc/min and the temperature is maintained for 2 hours. Then, 0.3 grams each of manganese acetate and $Sb_2(OCH_2CH_2O)_3$ are added to the reaction vessel. The reaction temperature is raised to 190° C. and the temperature is maintained for 4 hours. The nitrogen flow is increased to 500 cc/min. and the temperature is maintained for 1 hour. The nitrogen flow is increased to 800 cc/min. and the temperature is maintained at 205° C. for 1 hour. The total aqueous distillate collected is 47 grams. The final resin has an acid number of 12. The temperature is heated to 205° C. until the acid number is 20. The resin has $\overline{Mw}$=4520, $\overline{Mn}$=1410 and $\overline{Mw}/\overline{Mn}$=3.1.

(b) The above resin is diluted with styrene to a concentration of 80% resin and 20% styrene.

EXAMPLE 3

(a) A reaction vessel is charged with 109.5 grams of UNILIN 700, 238.3 grams of maleic anhydride, 267.5 grams of phthalic anhydride under a nitrogen sparge. The reaction mixture is heated until clear at 158° C. The reaction mixture is cooled to 140° C. where 297.6 grams of neopentylglycol and 139.5 grams of propyleneglycol are added to the reaction vessel. The temperature is heated to 190° C. and maintained for 8 hours while 73 grams of water distillate is collected. The final resin has an acid number of 15.

(b) The above resin is diluted with styrene to a concentration of 80% resin and 20% styrene.

EXAMPLE 4

A polyester resin is prepared as described in Example 1 except 20% of the styrene is replaced with divinyl benzene.

EXAMPLE 5

A polyester resin is prepared as described in Example 1 except 630 grams of UNILIN 700 is used in place of ethylene carbonate.

EXAMPLE 6

A conventional unsaturated polyester has 35% styrene and the polyester is prepared from 26.9% maleic anhydride, 20% phthalic anhydride, 20.8% propyleneglycol, and 32.2% neopentylglycol.

The following table relates to examples of polyester resins and polyesters resin systems prepared as described above. The percentages of the ingredients for the polyesters are by mole. The polyester resins are then blended with styrene to the proportions indicated.

TABLE 1

|  | Example 7 | Example 8 | Example 9 |
| --- | --- | --- | --- |
| Polyester | 57 | 80 | 80 |
| maleic anhydride | 30 | 27 | 26.3 |
| phthalic anhydride | 20 | 20 | 19.2 |
| propyleneglycol | 18 | 18 | 17.8 |
| neopentylglycol | 29 | 28 | 27.7 |
| trimethylolpropane | 3 | — | — |
| manganese acetate | 0.2 | — | — |
| $Sb_2(OCH_2CH_2O)_3$ | 0.2 | — | — |
| glycerol monostearate | — | 7 | — |
| UNILIN 700 | — | — | 8.8 |
| Styrene | 43% | 20% | 20% |

The following Examples relate to gelcoat compositions. The gelcoat compositions are prepared from a clear gelcoat composition. The gelcoat composition has 45.7% styrene and contains 0.5 parts of polysiloxane, 0.2 parts of ethyleneglycol, 4.4 parts of fumed silica, 0.44 parts of a UV stabilizer, 0.08 parts of potassium octanoate, 0.12 parts of cobalt octanoate (12%), 0.04 parts dimethylacetoacetamide, 0.5 parts methyl methacrylate per 100 parts of neat unsaturated polyester resin.

EXAMPLE A

A gelcoat is prepared by blending the resin system of Example 6 with the above gelcoat composition.

EXAMPLE B

A gelcoat is prepared by blending the resin system of Example 1 with the above gelcoat composition.

EXAMPLE C

A gelcoat is prepared by blending the polyester resin system of Example 1 with the above gelcoat compositions.

Then 24 parts of the polyester resin system of Example 6 is added to 76 parts the gelcoat.

EXAMPLE D

A gelcoat is prepared by blending the resin of Example 6 with the above gelcoat composition. Then, 20 parts of the resin of Example 8 is blended with 80 parts of the gelcoat.

EXAMPLE E

A gelcoat is prepared by blending the resin of Example 6 with the above gelcoat composition. Then, 20 parts of the resin of Example 9 is blended with 80 parts of the gelcoat.

EXAMPLE F

A gelcoat is prepared by blending the resin of example 1 with the above gelcoat composition. Then 1 part STYRID styrene suppressant is added to 100 parts of the gelcoat.

EXAMPLE G

A gelcoat is prepared by blending the resin of example 1 with the above gelcoat composition. Then 1 part of BYK-306 (a polydimethylsiloxane polyether) available from BYK Chemie USA is added to 100 parts of gelcoat.

EXAMPLE H

A gelcoat is prepared as described in Example B except the gelcoat additionally contains 0.01% by weight of Dow Corning 65 additive, available from Dow Corning Chemical.

EXAMPLE I

A gelcoat is prepared as described in Example B except 20% of the styrene is replaced with p-t-butylstyrene.

The following table contains test emission data for the above gelcoats. The reduction in volatile emissions is determined by the California Can Lid Test performed in accordance with Proposed Rule 1162 (South Coast Air Quality Management District). The gelcoats were cured using Lupersol DDM-9 peroxide initiator.

TABLE 2

| | Resin System | Volatile emission (g/m$^2$) | Gel time (min) |
|---|---|---|---|
| Example A | Example 6 | 154 | 10 |
| Example B | Example 1 | 89 | 9.9 |
| Example C | Example 10 | 44.2 | 8.5 |
| Example D | Example 11 | 102 | 10 |
| Example E | Example 12 | 87.8 | 9.0 |

As can be seen from the above table, gelcoat compositions prepared with the inventive polyesters have improved emissions over convention polyesters resins.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A polyester resin comprising (A) from about 5% to about 50% by weight reactive diluent and (B) from about 50% to about 95% by weight of an unsaturated polyester resin prepared from at least one component selected from the group consisting of from about 0.5% up to about 8% by mole of a polyhydric alcohol having at least three hydroxyl groups and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms.

2. A gelcoat comprising (A) from about 5% to about 50% by weight reactive diluent, (B) from about 50% to about 95% by weight of an unsaturated polyester resin system having an acid number of less than about 30 and prepared from at least one polycarboxylic acid or derivative thereof, at least one polyhydric alcohol, and at least one component selected from the group consisting from about 0.5% up to about 8% by mole of a polyhydric alcohol having at least three hydroxyl groups and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms, and at least one thixotropic agent.

3. The gelcoat of claim 2, wherein the reactive diluent is a vinyl monomer.

4. The gelcoat of claim 2, wherein the reactive diluent is selected from the group consisting of styrene, α-methylstyrene, vinyltoluene, divinylbenzene, and mixtures thereof.

5. The gelcoat of claim 2, wherein the polyester resin has a $\overline{Mw}/\overline{Mn}$ from about 2 to about 8.

6. The gelcoat of claim 2, wherein the polyester has an acid number of less than 30.

7. The gelcoat of claim 2, wherein the unsaturated polyester resin is prepared from about 35% to about 65% by mole of at least one polycarboxylic acids and from about 35% to about 65% by mole of polyhydric alcohols.

8. The gelcoat resin of claim 7, wherein the olefinically unsaturated carboxylic acids are a mixture of from about 40% to about 60% by mole of non-aromatic carboxylic acid having from about 3 to about 12 carbon atoms and from about 40% to about 60% by mole of an aromatic acid having from about 8 to about 18 carbon atoms.

9. The gelcoat of claim 8, wherein the non-aromatic carboxylic acid is maleic acid, anhydride or ester, or fumaric acid or ester, and the aromatic carboxylic acid or derivative is selected from the group consisting of phthalic anhydride, orthophthalic acid, isophthalic acid and terephthalic acid.

10. The gelcoat of claim 2, wherein the polyhydric alcohol of (i) is glycerol, pentaerythritol, trimethylolpropane or trimethylolethane.

11. The gelcoat of claim 2, wherein (ii) is a reaction product of a triol or higher polyol with a fatty acid.

12. The gelcoat of claim 2, wherein (ii) is a glycerol fatty acid ester having two hydroxyl groups.

13. The gelcoat of claim 2, wherein (iii) has from about 12 to about 90 carbon atoms.

14. The gelcoat of claim 2 further comprising an amount of a suppressant sufficient to reduce volatile emissions.

15. The gelcoat of claim 14, wherein the suppressant is a polyether, a polyether block copolymer, an alkoxylated alcohol, an alkoxylated fatty acid or a polysiloxane.

16. The gelcoat of claim 1 further comprising at least one surface tension agent.

17. The gelcoat of claim 2, wherein the thixotropic agent is fumed silica, precipitated silica or an inorganic clay.

18. The gelcoat of claim 2 further comprising an amount of a suppressant sufficient to reduce volatile emissions.

19. A method of reducing volatile organic emissions in cured polyester coatings and articles comprising the steps of incorporating a polyester resin system comprising (A) from about 5% to about 50% by weight reactive diluent and (B) from about 50% to about 95% by weight of an unsaturated polyester resin prepared from at least one component selected from the group consisting of from about 0.5% up to about 8% by mole of a polyhydric alcohol having at least three hydroxyl groups and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms into a curable composition, and curing the composition.

20. The method of claim 19 further comprising incorporating a conventional polyester resin in reactive diluent is incorporated in the curable composition.

21. The method of claim 19, further comprising incorporating an amount of a suppressant sufficient to suppress volatile organic compound emissions.

22. The gelcoat of claim 2, wherein the unsaturated polyester resin system has an acid number of less than 25.

23. The gelcoat of claim 2, wherein the unsaturated polyester resin system has an acid number of less than 20.

24. A gelcoat comprising (I) a polyester resin comprising (A) from about 5% to about 50% by weight reactive diluent and (B) from about 50% to about 95% by weight of an unsaturated carboxylic acid terminated polyester resin prepared from at least one polycarboxylic acid or derivative thereof, a monobasic carboxylic acid, at least polyhydric alcohol, and at least one component selected from the group consisting of (i) from about 0.5% up to about 8% by mole of a polyhydric alcohol, having at least three hydroxyl groups, and at least one transesterification catalyst, (ii) from about 2% up to about 12% by mole of a reaction product of a polyol and a fatty carboxylic acid, and (iii) from about 2% up to about 12% by mole of a fatty reactant selected from the group consisting of a fatty primary alcohol, a fatty epoxide, a fatty monocarboxylic acid and mixtures thereof, wherein each member of the group has up to about 100 carbon atoms, and at least one thixotropic agent.

25. The gelcoat of claim 24, wherein the unsaturated carboxylic acid terminated polyester resin is a benzoic acid terminated unsaturated polyester resin.

* * * * *